United States Patent
Noh et al.

(10) Patent No.: US 9,503,299 B2
(45) Date of Patent: Nov. 22, 2016

(54) METHOD AND APPARATUS FOR TRANSMITTING APERIODIC SOUNDING REFERENCE SIGNAL IN WIRELESS COMMUNICATION SYSTEM

(75) Inventors: Min Seok Noh, Anyang-si (KR); Sung Ho Moon, Anyang-si (KR); Jae Hoon Chung, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 259 days.

(21) Appl. No.: 13/702,517

(22) PCT Filed: May 16, 2011

(86) PCT No.: PCT/KR2011/003594
§ 371 (c)(1),
(2), (4) Date: Dec. 6, 2012

(87) PCT Pub. No.: WO2011/155711
PCT Pub. Date: Dec. 15, 2011

(65) Prior Publication Data
US 2013/0121279 A1    May 16, 2013

Related U.S. Application Data

(60) Provisional application No. 61/351,943, filed on Jun. 7, 2010, provisional application No. 61/417,896, filed on Nov. 30, 2010.

(30) Foreign Application Priority Data

Mar. 30, 2011  (KR) .................. 10-2011-0028930

(51) Int. Cl.
*H04W 52/32* (2009.01)
*H04W 52/16* (2009.01)
(Continued)

(52) U.S. Cl.
CPC ........ *H04L 27/2611* (2013.01); *H04J 11/0023* (2013.01); *H04W 52/16* (2013.01);
(Continued)

(58) Field of Classification Search
CPC ............. H04W 52/24; H04W 52/146; H04W 52/325; H04W 52/16; H04L 27/2611; H04L 5/0078; H04L 5/0048; H04L 5/0007; H04J 11/0023
USPC ........................................ 370/280, 329, 345
See application file for complete search history.

(56) References Cited

U.S. PATENT DOCUMENTS

2008/0200203 A1* 8/2008 Malladi et al. ............... 455/522
2008/0207150 A1  8/2008 Malladi et al.
(Continued)

FOREIGN PATENT DOCUMENTS

CN    101617482 A    12/2009
JP    2013-528016 A   7/2013
(Continued)

OTHER PUBLICATIONS

Huawei, "Uplink Multi-Antenna Power Control", Discussion/Decision, 3GPP TSG RAN WG1 meeting #61 Montreal, Canada, May 10-14, 2010, R1-103094, pp. 2-5.
(Continued)

*Primary Examiner* — Redentor Pasia
*Assistant Examiner* — Peter Mak
(74) *Attorney, Agent, or Firm* — Birch, Stewart, Kolasch & Birch, LLP

(57) ABSTRACT

A method and apparatus for transmitting an aperiodic sounding reference signal (SRS) in a wireless communication system is provided. The method include receiving a power offset parameter for an aperiodic SRS set by a base station (BS) through an higher layer, setting transmission power of the aperiodic SRS based on the power offset parameter, and transmitting the aperiodic SRS to the BS based on the set transmission power of the aperiodic SRS.

13 Claims, 4 Drawing Sheets

(51) Int. Cl.
  *H04W 52/14* (2009.01)
  *H04J 11/00* (2006.01)
  *H04L 5/00* (2006.01)
  *H04L 27/26* (2006.01)
  *H04W 52/24* (2009.01)

(52) U.S. Cl.
  CPC ......... *H04W 52/24* (2013.01); *H04W 52/325* (2013.01); *H04L 5/0007* (2013.01); *H04L 5/0048* (2013.01); *H04L 5/0078* (2013.01); *H04W 52/146* (2013.01)

(56) References Cited

U.S. PATENT DOCUMENTS

| | | | |
|---|---|---|---|
| 2009/0232118 A1 | 9/2009 | Wang et al. | |
| 2010/0246561 A1* | 9/2010 | Shin ...................... | H04W 52/32 370/345 |
| 2011/0199944 A1* | 8/2011 | Chen ..................... | H04L 5/0007 370/280 |
| 2011/0268028 A1* | 11/2011 | Stern-Berkowitz . | H04L 27/2613 370/328 |

FOREIGN PATENT DOCUMENTS

| | | |
|---|---|---|
| WO | WO 2008/101053 A2 | 8/2008 |
| WO | WO 2010/048142 A1 | 4/2010 |
| WO | WO 2011/123805 A1 | 10/2011 |

OTHER PUBLICATIONS

LG Electronics, "Dynamic Aperiodic Sounding for LTE-Advanced", Discussion/Decision, 3GPP TSG RAN WG1 Meeting #61 Montreal, Canada, May 10-14, 2010, R1-102731, pp. 1-4.

LG Electronics, "Uplink Power Control for E-UTRA," TSG-RAN WG1 #48bis, R1-071535, St. Julians, Malta, Mar. 26-30, 2007, pp. 1-4.

LTE, "3rd Generation Partnership Projects; Technical Specification Group Radio Access Network; Evolved Universal Terrestrial Radio Access (E-UTRA); Physical layer procedures (Release 9)," 3GPP TS 36.213 V9.1.0, Mar. 2010, pp. 1-79.

Samsung, "SRS Transmission Issues in LTE-A," 3GPP TSG RAN WG1 #57bis, R1-092677, Los Angeles, USA, Jun. 29-Jul. 3, 2009, pp. 1-3.

Qualcomm Incorporated, "UL grants for MIMO transmissions", 3GPP TSG-RAN WG1 #60, Agenda Item: 7.3.4, San Franciso, CA, Feb. 22-26, 2010, 4 pages, XP50419001A, R1-101493.

* cited by examiner

METHOD AND APPARATUS FOR TRANSMITTING APERIODIC SOUNDING REFERENCE SIGNAL IN WIRELESS COMMUNICATION SYSTEM

CROSS REFERENCE TO RELATED APPLICATIONS

This non-provisional application is a National Stage entry under U.S.C. §371 of International Application No. PCT/KR2011/003594 filed on May 16, 2011, which claims the benefit of U.S. Provisional Application No. 61/351,943 filed on Jun. 7, 2010, 61/417,896 filed on Nov. 30, 2010 and to Korean Patent Application No. 10-2011-0028930 filed in Korea, on Mar. 30, 2011. The entire contents of all of the above applications are hereby incorporated by reference.

TECHNICAL FIELD

The present invention relates to wireless communication and, more particularly, to a method and apparatus for transmitting an aperiodic sounding reference signal in a wireless communication system.

BACKGROUND ART

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h}=y/p=h+n/p=h+\hat{n} \qquad \text{<Equation 1>}$$

The accuracy of the channel estimation value ĥ estimated using the reference signal p is determined by the value $\hat{n}$. To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

An uplink reference signal may be classified into a demodulation reference signal (DMRS) and a sounding reference signal (SRS). The DMRS is a reference signal used for a channel estimation to modulate a received signal. The DMRS can be coupled with a PUSCH or PUCCH transmission. The SRS is a reference signal transmitted by a user equipment (UE) to a base station (BS) for uplink scheduling. The BS estimates an uplink channel through the received SRS and uses the estimated uplink channel for uplink scheduling. The SRS may be periodically transmitted or may be triggered by the BS and aperiodically transmitted to the BS when the BS requires a transmission of the SRS.

A user equipment (UE) may transmit a SRS with predetermined transmission power. In this case, transmission power of a periodic SRS and that of an aperiodic SRS may be set to be different, and to this end, different parameters may be signaled for the periodic SRS and the aperiodic SRS.

Thus, a method for determining the transmission power of the aperiodic SRS is required.

SUMMARY OF INVENTION

Technical Problem

The present invention provides a method and apparatus for transmitting an aperiodic sounding reference signal (SRS) in a wireless communication system.

Solution to Problem

In an aspect, a method for transmitting an aperiodic sounding reference signal (SRS) by a user equipment (UE) in a wireless communication system is provided. The method includes receiving a power offset parameter for an aperiodic SRS set by a base station (BS) through an higher layer, setting transmission power of the aperiodic SRS based on the power offset parameter, and transmitting the aperiodic SRS to the BS based on the set transmission power of the aperiodic SRS.

The power offset parameter may have a length of 4 bits.

The power offset parameter may be radio resource control (RRC) signaled.

The transmission power of the aperiodic SRS may be determined by Equation $$P_{SRS,c}(i)=\min\{P_{CMAX,c}(i),P_{SRS\_OFFSET,c}(m)+10\log_{10}(M_{SRS,c})+P_{O\_PUSCH,c}(j)+\alpha_c(j)\cdot PL_c+f_c(i)\}$$

based on the power offset parameter, and in the Equation, m is 1. i is a subframe index, c is a serving cell, $P_{CMAX,c}(i)$ is pre-set transmission power of the UE, $P_{SRS\_OFFSET,c}(m)$ is the power offset parameter, $M_{SRS,C}$ is a bandwidth of the SRS transmission indicated by the number of resource blocks, $P_{O\_PUSCH,c}(j)$ is a parameter configured by the sum of $P_{O\_NOMINAL\_PUSCH}(j)$, a cell-specific component given by an higher layer, and $P_{O\_UE\_PUSCH}(j)$, a UE-specific component also given by the higher layer, $\alpha_c(j)$ is a cell-specific parameter given by the higher layer, $PL_c$ is an estimated value of pathloss calculated by the UE, and f(i) indicates a current power control adjustment state with respect to a physical uplink shared channel (PUSCH).

The power offset parameter may be determined by a UE-specified parameter indicating a compensation value having a size of a transport block in power controlling.

When the value of the UE-specific parameter is 1.25, the power offset parameter may be determined in units of 1 dB within the range of [−3, 12] dB.

When the value of the UE-specific parameter is 0, the power offset parameter may be determined in units of 1.5 dB within the range of [40.5, 12] dB.

The transmission of the aperiodic SRS may be triggered by a triggering message transmitted from the BS.

In another aspect, a user equipment (UE) in a wireless communication system is provided. The UE includes a radio frequency (RF) unit, and a processor, coupled to the RF unit, and configured to receive a power offset parameter from a base station (BS) through an higher layer, set transmission power of an aperiodic sounding reference signal (SRS) set by the BS based on the power offset parameter for the aperiodic SRS, and transmit the aperiodic SRS to the BS based on the set transmission power of the aperiodic SRS.

Advantageous Effects of Invention

According exemplary embodiments of the present invention, a parameter for transmission power of an aperiodic SRS can be defined.

MODE FOR THE INVENTION

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ Generation, Partnership Project) LTE (Long Term Evolution) is part of an evolved UMTS (E-UMTS) using the E-UTRA, which employs the OFDMA in downlink and the SC-FDMA in uplink. LTE-A (Advanced) is an evolution of 3GPP LTE.

Hereinafter, for clarification, LET-A will be largely described, but the technical concept of the present invention is not meant to be limited thereto.

Figure 1:
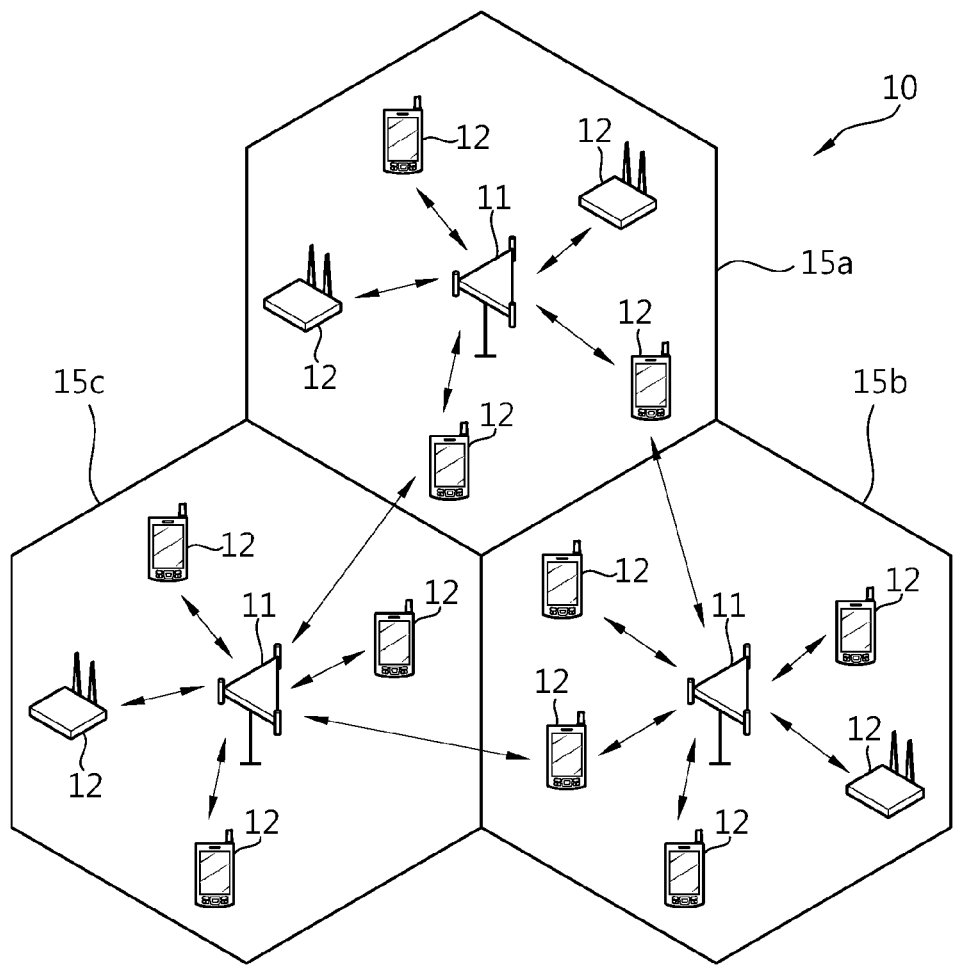
FIG. 1 illustrates a wireless communication system.

FIG. 1 illustrates a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (Mobile Station), MT (Mobile Terminal), UT (User Terminal), SS (Subscriber Station), wireless device, PDA (Personal Digital Assistant), wireless modem, handheld device. The BS 11 generally refers to a fixed station that communicates with the UE 12 and may be called by other names such as eNB (evolved-NodeB), BTS (Base Transceiver System), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a MIMO (Multiple-Input Multiple-Output) system, a MISO (Multiple-Input Single-Output) system, an SISO (Single-Input Single-Output) system, and an SIMO (Single-Input Multiple-Output) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
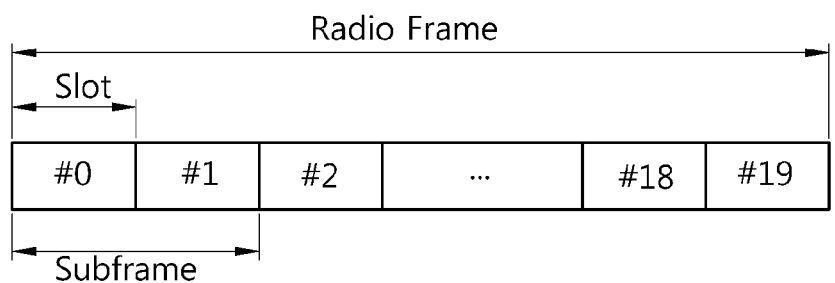
FIG. 2 illustrates the structure of a radio frame in 3GPP LTE.

FIG. 2 illustrates the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd Generation Partnership Project) TS 36.211 V8.2.0 (2008-03). With reference to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix and one slot includes six OFDM symbols in an extended CP.

The wireless communication system may be divided into an FDD (Frequency Division Duplex) scheme and a TDD (Time Division Duplex) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
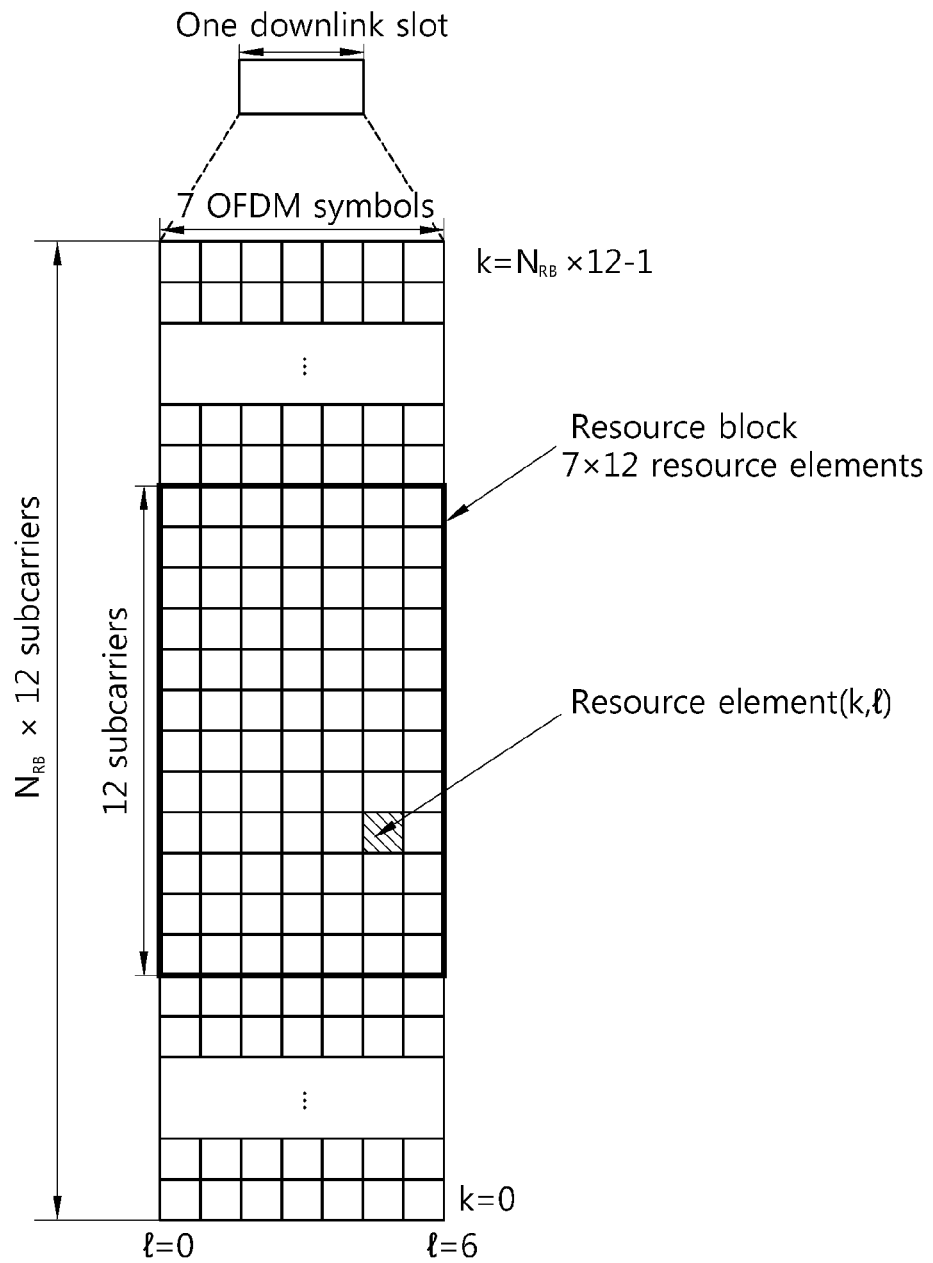
FIG. 3 illustrates an example of a resource grid of a single downlink slot.

FIG. 3 illustrates an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
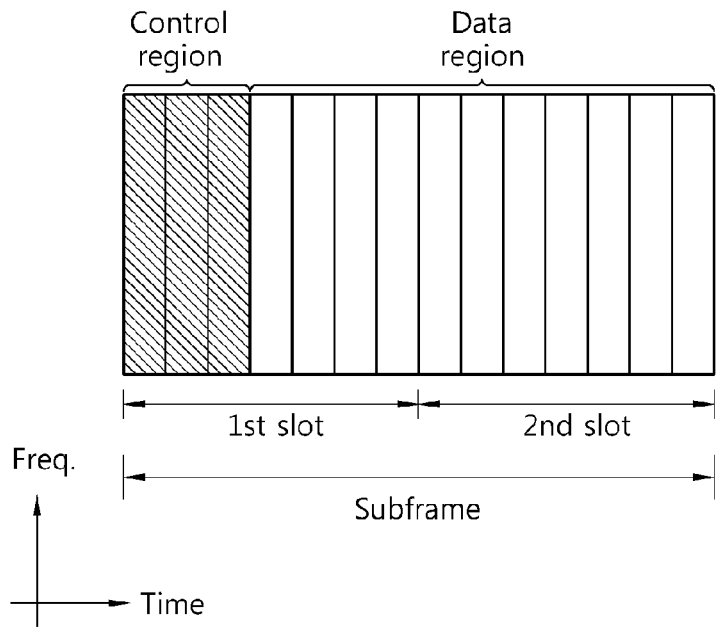
FIG. 4 illustrates the structure of a downlink subframe.

FIG. 4 illustrates the structure of a downlink subframe.

A downlink subframe includes two slots in the time domain, and each of the slots includes seven OFDM symbols in the normal CP. First three OFDM symbols (maximum four OFDM symbols with respect to a 1.4 Mhz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a DL-SCH (Downlink-Shared Channel), resource allocation information of a UL-SCH (Uplink Shared Channel), paging information on a PCH, system information on a DL-SCH, a resource allocation of an higher layer control message such as a random access response transmitted via a PDSCH, a set of transmission power control commands with respect to individual UEs in a certain UE group, an activation of a VoIP (Voice over Internet Protocol), and the like. A plurality of PDCCHs may be transmitted in the control region, and a UE can monitor a plurality of PDCCHs. The PDCCHs are transmitted on one or an aggregation of a plurality of consecutive CCE (Control Channel Elements). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be sent to the UE and attaches a CRC to control information. A unique RNTI (Radio Network Temporary Identifier) is masked on the CRC according to the owner or the purpose of the PDCCH. In case of a PDCCH for a particular UE, a unique identifier of the UE, e.g., a C-RNTI (Cell-RNTI), may be masked on the CRC. In case of a PDCCH for a paging massage, a paging indication identifier, e.g., a P-RNTI (Paging-RNTI) may be masked on the CRC. In case of a PDCCH for system information block (SIB), a system information identifier, i.e., SI-RNTI (System Information-RNTI), may be masked on the CRC. In order to indicate a random access response, i.e., a response to a transmission of a random access preamble of the UE, an RA-RNTI (Random Access-RNTI) may be masked on the CRC.

Figure 5:
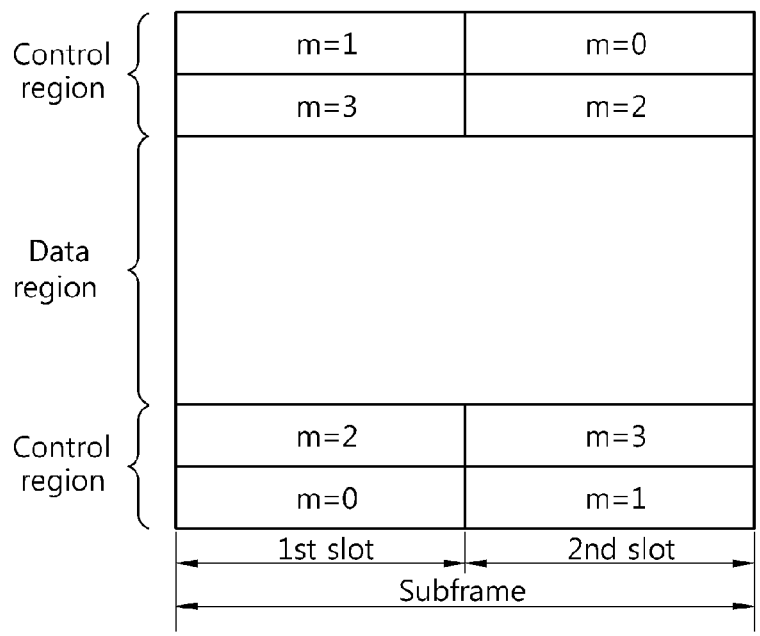
FIG. 5 illustrates the structure of an uplink subframe.

FIG. 5 illustrates the structure of an uplink subframe.

An uplink subframe may be divided into a control region and a data region in the frequency domain. A PUCCH (Physical Uplink Control Channel) for transmitting uplink control information is allocated to the control region. A PUSCH (Physical Uplink Shared Channel) for transmitting data is allocated to the data region. When indicated by an higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include HARQ (Hybrid Automatic Repeat reQuest) ACK (Acknowledgement)/NACK (Non-acknowledgement), a CQI (Channel Quality Indicator) indicating the state of a downlink channel, an SR (Scheduling Request), and the like.

The PUSCH is mapped to a UL-SCH (Uplink Shared Channel), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a PMI (Precoding Matrix Indicator), an HARQ, an RI (Rank Indicator), or the like. Or the uplink data may include only control information.

An uplink reference signal will now be described.

A reference signal is generally transmitted as a sequence. A reference signal sequence is not particularly limited and a certain sequence may be used as the reference signal sequence. As the reference signal sequence, a sequence generated through a computer based on PSK (Phase Shift Keying) (i.e., a PSK-based computer generated sequence) may be used. The PSK may include, for example, BPSK (Binary Phase Shift Keying), QPSK (Quadrature Phase Shift Keying), and the like. Or, as the reference signal sequence, a CAZAC (Constant Amplitude Zero Auto-Correlation) may be used. The CAZAC sequence may include, for example, a ZC (Zadoff-Chu)-based sequence, a ZC sequence with cyclic extension, a ZC sequence with truncation, and the like. Also, as the reference signal sequence, a PN (pseudo-random) sequence may be used. The PN sequence may include, for example, an m-sequence, a sequence generated through a computer, a gold sequence, a Kasami sequence, and the like. Also, a cyclically shifted sequence may be used as the reference signal sequence.

An uplink reference signal may be classified into a DMRS (Demodulation Reference Signal) and an SRS (Sounding Reference Signal). The DMRS is a reference signal used for a channel estimation to demodulate a received signal. The DMRS may be combined with a transmission of the PUSCH or the PUCCH. The SRS is a reference signal transmitted by the UE to the BS for uplink scheduling. The BS estimates an uplink channel through the received SRS and uses the estimated uplink channel in uplink scheduling. The SRS is not combined with the transmission of the PUSCH or the PUCCH. The same type of basic sequence may be used for the DMRS and the SRS. Meanwhile, in an uplink multi-antenna transmission, precoding applied to the DMRS may be the same as that applied to the PUSCH. A cyclic shift separation is a primary scheme for multiplexing the DMRS. In the LTE-A system, SRS may not be precoded, or may be an antenna-specified reference signal.

The SRS is a reference signal transmitted by the UE or a relay station (RS) to the BS, which is not related to an uplink data or control signal transmission. The SRS is generally used to estimate channel quality for frequency selective scheduling in uplink, or may be used for a different purpose. For example, the SRS may be also used for power controlling, an initial MCS selection, initial power controlling for a data transmission, and the like. The SRS is generally transmitted in a final SC-FDMA symbol of a subframe.

An SRS sequence is defined to be $r_{SRS}(n)=r_{u,v}^{(\alpha)}(n)$. A reference signal sequence $r_{u,v}^{(\alpha)}(n)$ can be defined based on a basic sequence $b_{u,v}(n)$ and a cyclic shift $\alpha$.

$$r_{u,v}^{(\alpha)}(n)=e^{j\alpha n}b_{u,v}(n), 0\leq n<M_{sc}^{RS} \qquad \text{<Equation 2>}$$

In Equation 2, $M_{sc}^{RS}$ ($1\leq m\leq N_{RB}^{max,UL}$) is the length of a reference signal sequence, and $M_{sc}^{RS}=m*N_{sc}^{RB}$. $N_{sc}^{RB}$ is the size of a resource block indicated by the number of subcarriers in the frequency domain and $N_{RB}^{max,UL}$ is a maximum value of an uplink bandwidth indicated by a multiple of $N_{sc}^{RB}$. A plurality of reference signal sequences may be defined by differently applying, a cyclic shift value, from one basic sequence.

The basic sequence $b_{u,v}(n)$ is divided into a plurality of groups, and in this case, $u\in\{0,1,\ldots,29\}$ is a group index and v is a basic sequence index in a group. A basic sequence is dependent upon the length ($M_{sc}^{RS}$) of the basic sequence. Each group includes one basic sequence (v=0) having a length of $M_{sc}^{RS}$ with respect to m ($1\leq m\leq 5$), and includes two basic sequences (v=0,1) having a length of $M_{sc}^{RS}$ with respect to m ($6\leq m\leq n_{RB}^{max,UL}$). The sequence group index u and the basic sequence index v of a group may change over time like group hopping or sequence hopping (to be described).

In the SRS sequence, u is a PUCCH sequence group index, and v is a basic sequence index. The cyclic shift value is defined by Equation 3 shown below:

$$\alpha = 2\pi\frac{n_{SRS}^{cs}}{8} \qquad \text{<Equation 3>}$$

In Equation 3, $n_{SRS}^{cs}$ is a value configured by an higher layer with respect to each UE, which may be any one of integers 0 to 7.

In order to satisfy the transmission power $P_{SRS}$, the SRS sequence is multiplied by an amplitude scaling factor $\beta_{SRS}$ and then mapped to a resource element. The SRS sequence may be mapped, starting from $r_{SRS}(0)$, to a resource element (k,l) according to Equation 4 shown below:

$$a_{2k+k_0,l} = \begin{cases} \beta_{SRS} r^{SRS}(k) & k=0,1,\ldots,M_{sc,b}^{RS}-1 \\ 0 & \text{otherwise} \end{cases} \qquad \text{<Equation 4>}$$

In Equation 4, $k_0$ is a starting position in the frequency domain of the SRS, and $M_{sc,b}^{RS}$ is the length of the SRS sequence defined by Equation 5 shown below:

$$M_{sc,b}^{RS}=m_{SRS,b}N_{sc}^{RB}/2 \qquad \text{<Equation 5>}$$

In Equation 5, $m_{SRS,b}$ can be given by Table 1 to Table 4 (to be described) with respect to each uplink bandwidth $N_{RB}^{UL}$.

In Equation 4, $k_0$ can be defined by Equation 6 shown below:

$$k_0 = k_0' + \sum_{b=0}^{B_{SRS}} 2M_{sc,b}^{RS}n_b \qquad \text{<Equation 6>}$$

In Equation 6, $k_0'$ is given as $$k_0'=(\lfloor N_{RB}^{UL}/2\rfloor-m_{SRS,0}/2)N_{SC}^{RB}+k_{TC}$$

in a normal uplink subframe. $k_{TC}\in\{0,1\}$ is a parameter given to the UE by an higher layer, and $n_b$ is a frequency position index.

Frequency hopping of the SRS is configured by $b_{hop}\in\{0,1,2,3\}$. When frequency hopping of the SRS is not available ($b_{hop}\geq B_{SRS}$), it is determined by the constant of the frequency position index $$n_b=\lfloor 4n_{RRC}/m_{SRS,b}\rfloor \bmod N_b,$$

and $n_{RRC}$ is given by the higher layer. When frequency hopping of the SRS is available ($b_{hop}<B_{SRS}$), the frequency position index $n_b$ may be determined by Equation 7 shown below:

$$n_b = \begin{cases} \lfloor 4n_{RRC}/m_{SRS,b}\rfloor \bmod N_b & b\leq b_{hop} \\ \{F_b(n_{SRS})+\lfloor 4n_{RRC}/m_{SRS,b}\rfloor\}\bmod N_b & \text{otherwise} \end{cases} \qquad \text{<Equation 7>}$$

In Equation 7, $n_b$ is determined by Table 1 to Table 4 (to be described), and $F_b(n_{SRS})$ may be determined by Equation 8 shown below:

$$F_b(n_{SRS}) = \begin{cases} (N_b/2)\left\lfloor \dfrac{n_{SRS} \bmod \Pi_{b'=b_{hop}}^{b} N_{b'}}{\Pi_{b'=b_{hop}}^{b-1} N_{b'}} \right\rfloor + \left\lfloor \dfrac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases}$$ ⟨Equation 8⟩

In Equation 8, $n_{SRS}$ indicates the number of UE-specific SRS transmissions, which may be determined by Equation 9 shown below:

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2ms SRS periodicity of frame structure 2} \\ \lfloor (n_f \times 10 + \lfloor n_s/2 \rfloor)/T_{SRS} \rfloor, & \text{otherwise} \end{cases}$$ ⟨Equation 9⟩

In Equation 9, $T_{SRS}$ is UE-specific periodicity, $T_{offset}$ is an SRS subframe offset, and $T_{offset\_max}$ is a maximum value of $T_{offset}$ for a particular configuration of an SRS subframe offset. $T_{SRS}$ and $T_{offset}$ can be given by Table 7 and Table 8 shown below.

Table 1 to Table 4 show an example of SRS bandwidth configurations. A 3-bit cell-specific parameter may be broadcast in order to indicate a configuration of one of eight bandwidths. Also, a 2-bit UE-specific parameter may be given by an higher layer in order to indicate a configuration of one of four bandwidths.

Table 1 shows an example of $m_{SRS,b}$ and $N_b(b=0,1,2,3)$ when an uplink bandwidth $N_{RB}^{UL}$ is within the range of $6 \leq N_{RB}^{UL} \leq 40$.

TABLE 1

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 2 shows an example of $m_{SRS,b}$ and $N_b(b=0,1,2,3)$ when an uplink bandwidth $N_{RB}^{UL}$ is within the range of $40 \leq N_{RB}^{UL} \leq 60$.

TABLE 2

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 3 shows an example of $m_{SRS,b}$ and $N_b(b=0,1,2,3)$ when an uplink bandwidth $N_{RB}^{UL}$ is within the range of $60 \leq N_{RB}^{UL} \leq 80$.

TABLE 3

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 4 shows an example of $m_{SRS,b}$ and $N_b(b=0,1,2,3)$ when an uplink bandwidth $N_{RB}^{UL}$ is within the range of $80 \leq N_{RB}^{UL} \leq 110$.

TABLE 4

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Table 1 to Table 4, $C_{SRS} \in \{0,1,2,3,4,5,6,7\}$, a cell-specific parameter, and $B_{SRS} \in \{0,1,2,3\}$, a UE-specific parameter, are given by an higher layer.

Table 5 and 6 show examples of a cell-specific subframe configuration period parameter $T_{SFC}$ and a cell-specific subframe offset parameter $\Delta_{SFC}$ with respect to SRS transmission.

Table 5 shows an example of an SRS subframe configuration in the FDD system. According to Table 5, the SRS subframe configuration can be indicated by a parameter having a 4-bit length and the period of the SRS subframe may be any one of 1, 2, 5, and 10 subframes.

TABLE 5

| srsSubframe-Configuration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 6 shows an example of an SRS subframe configuration in the TDD system.

TABLE 6

| srsSubframe-Configuration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Uplink power controlling will now be described. This may refer to "3$^{rd}$ Generation Partnership project; Technical Specification Group Radio Access Network; Evolved Universal Terrestrial Radio Access (E-UTRA); Physical layer procedures (Release 9)" of 3GPP TS 36.213. V9.0.0 (2009-12). In the uplink power controlling, each transmission power of different uplink physical channels is controlled. Namely, in uplink power controlling, average power on SC-FDAM symbols through which a physical channel is transmitted is determined.

The UE may set transmission power of the PUSCH in the subframe i as represented by Equation 10 shown below:

$$P_{PUSCH}(i)=\min\{P_{CMAX}, 10\log_{10}(M_{PUSCH}(i))+P_{O\_PUSCH}(j)+\alpha(j)\cdot PL+\Delta_{TF}(i)+f(i)\} \quad \text{<Equation 10>}$$

In Equation 10, $P_{CMAX}$ is predetermined transmission power of the UE and $M_{PUSCH}(i)$ is a bandwidth of a PUSCH resource allocation effective in subframe i indicated by the number of resource blocks.

In Equation 10, $P_{O\_PUSCH}(j)$ is a parameter configured by the sum of $P_{O\_NOMINAL\_PUSCH}(j)$, a cell-specific nominal component given by the higher layer, and $P_{O\_UE\_PUSCH}(j)$, a UE-specific component also given by the higher layer. In case of (re)transmission of the PUSCH corresponding to a semi-persistent grant, j is 0, in case of (re)transmission of the PUSCH corresponding to a dynamic scheduled grant, j is 1, and in case of (re)transmission of the PUSCH corresponding to a random access response grant, j is 2. $P_{O\_UE\_PUSCH}(2)=0$, and $P_{O\_NOMINAL\_PUSCH}(2)=P_{O\_PRE}+\Delta_{PREAMBLE\_Msg3}$. In this case, $P_{O\_PRE}$ and $\Delta_{PREAMBLE\_Msg3}$ are signaled by the higher layer.

In Equation 10, when j is 0 or when j is 1, $\alpha \in \{0, 0.4, 0.5, 0.6, 0.7, 0.8, 0.9, 1\}$ and, in this case, $\alpha$ is a 3-bit cell-specific parameter given by the higher layer. When j is 2, $\alpha(j)=1$. PL is an estimated value of pathloss calculated by the UE.

When Ks=1.25, it is determined that $\Delta_{TF}(i)=10\log_{10}((2^{MPR*Ks}-1)\beta_{offset}^{PUSCH})$, and when Ks=0, it is determined that $\Delta_{TF}(i)=0$. Ks is a UE-specific parameter given by the higher layer, and it is a compensation value having the size of a transport block for power controlling. When control data is transmitted via the PUSCH without UL-SCH (Uplink Shared Channel) data, $MPR=O_{CQI}/N_{RE}$, or otherwise, MPR is determined to be $$\sum_{r=0}^{C-1} K_r/N_{RE}.$$

In this case, C is the number of code blocks, Kr is the size of a code block r, $O_{CQI}$ is the number of CQI bits including CRC (Cyclic Redundancy Checking) bits, and $N_{RE}$ is the number of resource elements. Also, when the control data is transmitted via the PUSCH without the UL-SCH data, $\beta_{offset}^{PUSCH}=\beta_{offset}^{CQI}$, or otherwise, $\beta_{offset}^{PUSCH}=1$.

f(i) indicates a current power control adjustment state of the PUSCH. Meanwhile, $\delta_{PUSCH}$ is a UE-specific correction value called a TPC command. $\delta_{PUSCH}$ may be included in a DCI format 0 of the PDCCH or may be jointly coded with a different TPC command of a DCI format 3/3A of the PDCCH in which a CRC parity bit is scrambled with a TPC-PUSCH-RNTI. When accumulation can be available by a UE-specific parameter given by the higher layer or when $\delta_{PUSCH}$ is included in the DCI format 0 of the PDCCH in which the CRC is scrambled with a temporary C-RNTI, it may be determined that $f(i)=f(i-1)+\delta_{PUSCH}(i-K_{PUSCH})$. In this case, $\delta_{PUSCH}(i-K_{PUSCH})$ is signaled on the DCI format 0 or 3/3A of the PDCCH in a subframe i-$K_{PUSCH}$. $K_{PUSCH}$ varies according to the TDD or FDD system. Also, when accumulation is not available by the UE-specific parameter given by the upper layer, it may be determined that $f(i)=\delta_{PUSCH}(i-K_{PUSCH})$. In this case, $\delta_{PUSCH}(i-K_{PUSCH})$ is signaled on the DCI format 0 of the PDCCH in the subframe i-$K_{PUSCH}$. $K_{PUSCH}$ varies according to the TDD or FDD system.

In subframe i, a power headroom (PH) may be determined by Equation 11 shown below:

$$PH(i)=P_{CMAX}-\{10\log_{10}(M_{PUSCH}(i))+P_{O\_PUSCH}(j)+\alpha(j)\cdot PL+\Delta_{TF}(i)+f(i)\} \quad \text{<Equation 11>}$$

In Equation 11, $P_{CMAX}$, $M_{PUSCH(i)}$, $P_{O\_PUSCH}(j)$, $\alpha(j)$, PL, $\Delta TF(i)$, and f(i) are the same as described above with respect to Equation 10.

The operation performed by the UE for an SRS transmission is as follows.

When the UE transmits an SRS, transmission power $P_{SRS}$ in the subframe i may be determined by Equation 12 shown below:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)\} \quad \text{<Equation 12>}$$

In Equation 12, $P_{CMAX}$ is pre-set transmission power of the UE. $P_{SRS\_OFFSET}$ is a UE-specific parameter having a 4-bit length determined semi-statically by the higher layer. When Ks=1.25, $P_{SRS\_OFFSET}$ may be determined in units of 1 dB within the range of [−3, 12] dB. When Ks=0, $P_{SRS\_OFFSET}$ may be determined in units of 1.5 dB within the range of [−10.5, 12] dB. $M_{SRS}$ is a bandwidth of the SRS transmission indicated by the number of resource blocks, and f(i) is a current power control adjustment state with respect to the PUSCH. $P_{O\_PUSCH}(j)$ and α(j) are as described above with reference to Equation 10.

In case in which the UE can select a transmission antenna, an index of a UE antenna $a(n_{SRS})$ for transmitting SRS during an $n_{SRS}$ time is given as $a(n_{SRS})=n_{SRS}$ mod 2 with respect to the entire sounding bandwidth or a partial sounding bandwidth when frequency hopping is not available, and it may be given by Equation 13 shown below when frequency hopping is available.

$$a(n_{SRS}) = \begin{cases} (n_{SRS} \cdot \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases} \quad \text{⟨Equation 13⟩}$$

In Equation 13, $B_{SRS}$ is an SRS bandwidth and $b_{hop}$ is a frequency hopping bandwidth, $N_b$ may be determined by a predetermined table according to $C_{SRS}$ and $B_{SRS}$, and $$K = \sum_{b'=b_{hop}}^{B_{SRS}} N_{b'}.$$

In Equation 13, β can be determined by Equation 14 shown below:

$$\beta = \begin{cases} 1 & \text{where } K \bmod 4 = 0 \\ 0 & \text{otherwise} \end{cases} \quad \text{⟨Equation 14⟩}$$

In the TDD system, when a single SC-FDMA symbol exists in a UpPTS (Uplink Pilot Time Slot), the corresponding SC-FDMA symbol can be used for the SRS transmission. When two SC-FDMA symbols exist in the UpPTS, the corresponding two SC-FDMA symbols can be all used for the SRS transmission and can be simultaneously allocated to a single UE.

When the SRS transmission and the transmission of the PUCCH format 2/2a/2b concurrently occur in the same subframe, the UE does not transmit the SRS anytime.

In case in which the ackNackSRS-SimultaneousTransmission parameter is false, when the SRS transmission and the transmission of the PUCCH carrying the ACK/NACK and/or the positive SR are preformed in the same subframe, the UE do not always transmit the SRS. Also, In case in which the ackNackSRS-SimultaneousTransmission parameter is true, when the SRS transmission and the transmission of the PUCCH carrying the ACK/NACK and/or the positive SR are configured in the same subframe, the UE uses a shortened PUCCH format and simultaneously transmits the PUCCH carrying the ACK/NACK and/or positive SR and the SRS. Namely, when the PUCCH carrying the ACK/NACK and/or positive SR is configured in the SRS subframe which is set to be cell-specific, the UE uses the shortened PUCCH format and simultaneously transmits the PUCCH carrying the ACK/NACK and/or positive SR and the SRS. When the SRS transmission overlaps with a PRACH (Physical Random Access Channel) for a preamble format 4 or when it exceeds the range of the uplink system bandwidth configured in the cell, the UE does not transmit the SRS.

The parameter, ackNackSRS-SimultaneousTransmission, given by the higher layer determines whether or not the UE supports simultaneous transmission of the PUCCH carrying the ACK/NACK and the SRS in a single subframe. When the UE is configured to simultaneously transmit the PUCCH carrying the ACK/NACK and the SRS in a single subframe, the UE can transmit the ACK/NACK and the SRS in a cell-specific SRS subframe. At this time, the shortened PUCCH format may be used, and a transmission of an SR or ACK/NACK corresponding to a position at which the SRS is transmitted is omitted (or punctured). When shortened PUCCH format is used in the cell-specific SRS subframe even when the SRS is not transmitted in the corresponding subframe. When the UE is configured not to simultaneously transmit the PUCCH carrying the ACK/NACK and the SRS in a single subframe, the UE may use a general PUCCH format 1/1a/1b in order to transmit the ACK/NACK and SR.

Table 7 and Table 8 show an example of a UE-specific SRS configuration indicating an SRS transmission period $T_{SRS}$ and a subframe offset $T_{offset}$. The SRS transmission period $T_{SRS}$ may be determined to be any one of {2, 5, 10, 20, 40, 80, 160, 320} ms.

TABLE 7

| SRS Configuration Index $I_{SRS}$ | SRS Periodicity $T_{SRS}$ (ms) | SRS Subframe Offset $T_{offset}$ |
| --- | --- | --- |
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

Table 8 shows an example of an SRS configuration in the TDD system.

TABLE 8

| Configuration Index $I_{SRS}$ | SRS Periodicity $T_{SRS}$ (ms) | SRS Subframe Offset $T_{offset}$ |
| --- | --- | --- |
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

In case in which $T_{SRS}>2$ in the TDD system and in case of the FDD system, the SRS subframe satisfies ($10*n_f+k_{SRS}$−

$T_{offset}$) mod $T_{SRS}$=0. $n_f$ indicates a frame index, and $k_{SRS}$ is a subframe index in a frame in the FDD system. In the TDD system, when $T_{SRS}$=2, two SRS resources can be configured in a half frame including at least one uplink subframe and the SRS subframe satisfies $(k_{SRS}-T_{offset})$mod 5=0.

In the TDD system, $k_{SRS}$ may be determined as shown in Table 9 below.

TABLE 9

| | subframe index n | | | | | | | | | |
|---|---|---|---|---|---|---|---|---|---|---|
| | 1 | | | | | 6 | | | | |
| 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | 2 | 3 | 4 | | 5 | 6 | 7 | 8 | 9 |
| $k_{SRS}$ in case UpPTS length of 1 symbol | 1 | | 2 | 3 | 4 | | 6 | | 7 | 8 | 9 |

Meanwhile, when a transmission of the PUSCH corresponding to a re-transmission of the same transport block is performed in the same subframe as part of the SRS transmission and a certain access response grant or a contention-based access procedure, the UE does not transmit the SRS anytime.

The SRS transmission method may be classified into two types of methods: A periodic SRS transmission method, defined in LTE rel-8, for periodically transmitting the SRS according to an SRS parameter received through RRC (Radio Resource Control) signaling; and an aperiodic SRS transmission method for transmitting the SRS as necessary based on a dynamically triggered message from the BS. The aperiodic SRS transmission method may be introduced to the LTE-A.

Meanwhile, in the periodic SRS transmission method and the aperiodic SRS transmission method, the SRS may be transmitted in a particular SRS subframe which has been determined to be UE-specific. In the period SRS transmission method defined in the LTE rel-8, cell-specific SRS subframes are periodically set by a cell-specific SRS parameter, and a periodic SRS is transmitted in a periodic UE-specified SRS subframe set by a UE-specific SRS parameter among the cell-specific SRS subframes. In this case, the periodic UE-specific SRS subframe may be a certain subset of the cell-specific SRS subframes. The cell-specific SRS parameter may be given by the higher layer. In the aperiodic SRS transmission method, an aperiodic SRS may be transmitted in an aperiodic UE-specific SRS subframe determined by a UE-specific aperiodic SRS parameter. The aperiodic UE-specific SRS subframe of the aperiodic SRS transmission method may be a subset of the cell-specific SRS subframes defined in the LTE rel-8. Or, the aperiodic UE-specific SRS subframe may be the same as the cell-specific SRS subframe. Like the cell-specific SRS parameter, the UE-specific aperiodic SRS parameter can be also given by the higher layer. The UE-specific aperiodic SRS subframe may be set by the sub-frame period and subframe offset in Table 7 and Table 8.

As stated above, SRS transmission power is determined by Equation 10. Equation 10 determines transmission power of the periodic SRS, so $P_{SRS\_OFFSET}$ in Equation 10 is provided through RRC signaling. However, a method for determining transmission power of an aperiodic SRS has not been proposed yet, so a signaling method for determining transmission power of an aperiodic SRS is required to be proposed.

Figure 6:
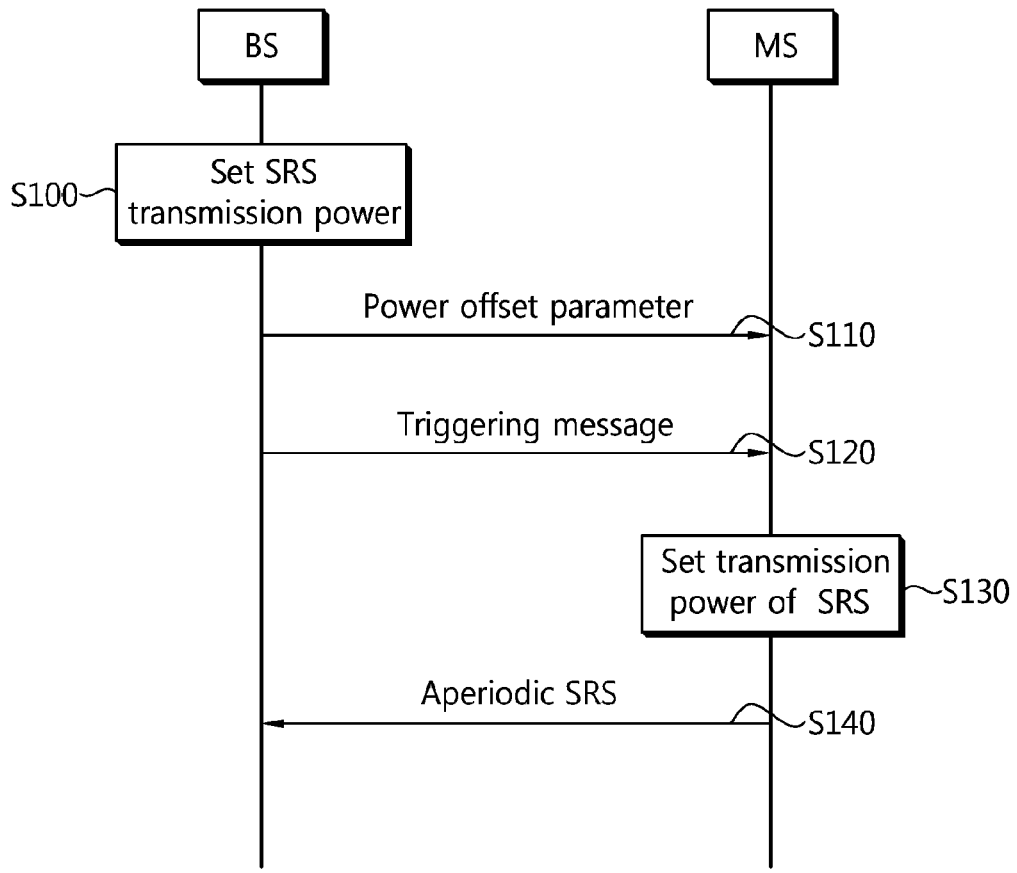
FIG. 6 illustrates a flow chart illustrating a proposed method for transmitting an aperiodic SRS.

FIG. 6 illustrates a flow chart illustrating a proposed method for transmitting an aperiodic SRS.

In step S100, the BS sets a power offset parameter for an aperiodic SRS. In step S110, the UE receives the power offset parameter through a higher layer from the BS. In step S120, the UE receives a triggering message for triggering a transmission of the aperiodic SRS from the BS. In step S130, the UE sets transmission power of the aperiodic SRS based on the power offset parameter. In step S140, the UE transmits the aperiodic SRS to the BS based on the set transmission power of the aperiodic SRS.

Various methods may be proposed in order for the UE to determine SRS transmission power. In particular, besides the transmission power of the periodic SRS, a newly introduced method for determining transmission power of an aperiodic SRS may be proposed. In addition, according to the method for determining transmission power of an aperiodic SRS, a method for signaling a parameter for the aperiodic SRS may be also proposed.

First, unlike the parameter for determining transmission power of the periodic SRS, a parameter for determining transmission power of an aperiodic SRS can be dynamically signaled through a PDCCH, and a triggering message transmitted from the BS may be aperiodically transmitted in order to correspond to the transmission of the aperiodic SRS. Accordingly, the transmission power of the aperiodic SRS can be dynamically determined.

Or, the parameter for determining the transmission power of the aperiodic SRS may be signaled through RRC, like the parameter for determining the transmission power of the periodic SRS. In this case, the parameter for the transmission power of the periodic SRS and that for the transmission power of the aperiodic SRS may be configured to be separated. Or, the parameters for the transmission power of the aperiodic SRS can be configured with only some of the parameters for the transmission power of the periodic SRS. This means that, in that both the periodic SRS and the aperiodic SRS commonly perform a channel estimation, some of the parameters for the transmission power of the SRS are applied to both the periodic SRS and the aperiodic SRS while the other remaining parameters are separately applied to the periodic SRS and the aperiodic SRS.

For example, the aperiodic SRS may perform an instantaneous channel measurement compared with the periodic SRS and requests an accurate channel estimation compared with the periodic SRS. Accordingly, a power offset for determining the transmission power of the aperiodic SRS and that for determining the transmission power of the periodic SRS may be configured to be different. Namely, the power offset for the transmission power of the existing periodic SRS is used as it is for the transmission power of the periodic SRS in the LTE-A, and the power offset for the transmission power of the aperiodic SRS may be newly defined in the LTE-A.

Like that of the periodic SRS, the newly defined power offset for the transmission power of the aperiodic SRS may be indicated by an uplink power control parameter transmitted on system information or may be indicated through RRC signaling. Or, since a triggering message of the aperiodic SRS can be dynamically transmitted through the PDCCH, the power offset for the transmission power of the aperiodic SRS can be also indicated through the PDCCH.

Equation 15 shows an example for determining the transmission power of the aperiodic SRS in the proposed aperiodic SRS transmission method.

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}$$ <Equation 15>

Equation 15 can determine both the transmission power of the periodic SRS and that of the aperiodic SRS. In Equation 15, c refers to a serving cell. Equation 15 is similar to Equation 12 for determining the transmission power of the periodic SRS, but in Equation 15, the power offset $P_{SRS\_OFFSET,c}(m)$ is determined according to whether the periodic SRS is transmitted or the aperiodic SRS is transmitted. The power offset $P_{SRS\_OFFSET,c}(m)$ may be a parameter having a 4-bit length determined anti-statically determined by a higher layer, and when m=0, the power offset in the periodic SRS can be indicated, and when m=1, the power offset in the aperiodic SRS can be indicated. Like Equation 12, when Ks=1.25, $P_{SRS\_OFFSET,c}(m)$ can be determined in units of 1 dB within the range of [−3, 12] dB. When Ks=0, $P_{SRS\_OFFSET,c}(m)$ can be determined in units of 1.5 dB within the range of [40.5, 12] dB. $P_{CMAX,c}(i)$ in Equation 15 is the same parameter as $P_{CMAX}$ in Equation 12, $M_{SRS,c}$ in Equation 15 is the same parameter as $M_{SRS}$ in Equation 12, $P_{O\_PUSCH,c}$ is the same parameter as $P_{O\_PUSCH}$ in Equation 12, $\alpha_c(j)$ in Equation 15 is the same parameter as $\alpha(j)$ in Equation 12, and $PL_c$ in Equation 15 is the same parameter as PL in Equation 12, and $f_c(i)$ in Equation 15 is the same parameter as f(i) in Equation 12.

Figure 7:
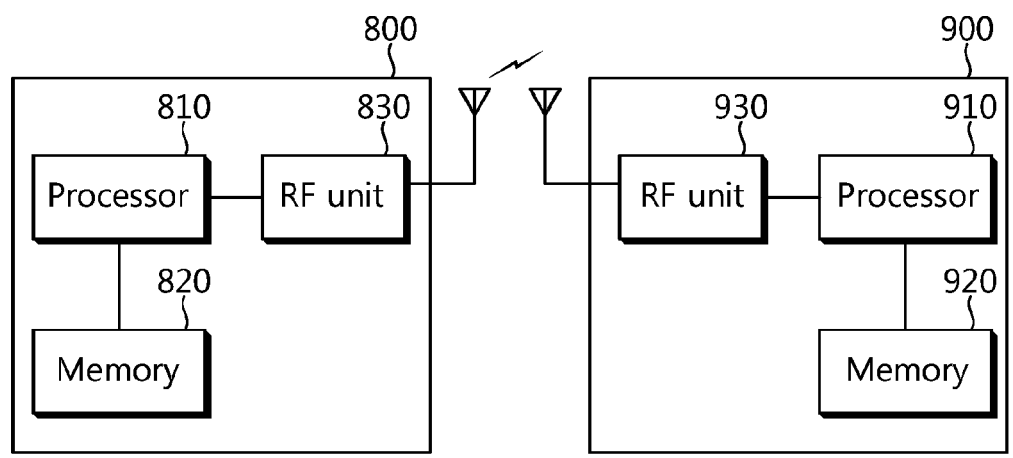
FIG. 7 is a block diagram showing wireless communication system to implement an embodiment of the present invention.

FIG. 7 is a block diagram showing wireless communication system to implement an embodiment of the present invention.

A BS 800 includes a processor 810, a memory 820, and an RF (Radio Frequency) unit 830. The processor 810 may be configured to implement proposed functions, procedures, and/or methods in this description. Layers of the radio interface protocol may be implemented in the processor 810. The processor 810 is configured to set a power offset parameter for an aperiodic SRS, and transmit the power offset parameter to the UE through an upper layer. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The processor 910 is configured to set transmission power of an aperiodic SRS based on the power offset parameter for the aperiodic SRS given by a higher layer, and transmit the aperiodic SRS based on the set transmission power. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting an aperiodic sounding reference signal (SRS) by a user equipment (UE) in a wireless communication system, the method comprising:
   receiving separate periodic and aperiodic SRS power offset parameters for a periodic SRS and an aperiodic SRS, respectively, from a base station (BS) through a radio resource control (RRC) signaling;
   receiving common parameters for both the periodic SRS and the aperiodic SRS from the BS through the RRC signaling;
   setting transmission powers of the periodic SRS and the aperiodic SRS based on the periodic and aperiodic SRS power offset parameters, respectively, and the common parameters; and
   transmitting the periodic SRS and the aperiodic SRS to the BS based on the transmission powers of the periodic SRS and the aperiodic SRS, respectively,
   wherein the periodic SRS power offset parameters are non-common parameters used for transmitting the periodic SRS but not the aperiodic SRS, and the aperiodic SRS power offset parameters are non-common parameters used for transmitting the aperiodic SRS but not the periodic SRS.

2. The method of claim 1, wherein at least one of the periodic SRS power offset parameters and at least one of the aperiodic SRS power offset parameters have a length of 4 bits, respectively.

3. The method of claim 1, wherein the transmission power of the periodic SRS and the transmission power of the aperiodic SRS, are determined by Equation below:

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\},$$

wherein i is a subframe index, c is a serving cell, $P_{CMAX,c}(i)$ is pre-set transmission power of the UE, $P_{SRS\_OFFSET,c}(m)$ denotes one of the periodic SRS power offset parameters when m=0 and $P_{SRS\_OFFSET,c}(m)$ denotes one of the aperiodic SRS power offset parameters when m=1, $M_{SRS,c}$ is a bandwidth of the SRS transmission indicated by the number of resource blocks, $P_{O\_PUSCH,c}(j)$ is a parameter configured by the sum of $P_{O\_NOMINAL\_PUSCH}(j)$ a cell-specific component given by an higher layer, and $P_{O\_UE\_PUSCH}(j)$, a UE-specific component also given by the higher layer, $\alpha_c(j)$ is a cell-specific parameter given by the higher layer, $PL_c$ is an estimated value of pathloss calculated by the UE, and f(i) indicates a current power control adjustment state with respect to a physical uplink shared channel (PUSCH).

4. The method of claim 1, wherein at least one of the periodic SRS power offset parameters and at least one of the aperiodic SRS power offset parameters are determined by a UE-specified parameter indicating a compensation value having a size of a transport block in power controlling.

5. The method of claim 4, wherein when the value of the UE-specific parameter is 1.25, the at least one of the periodic and aperiodic SRS power offset parameters is determined in units of 1 dB within the range of [−3, 12] dB.

6. The method of claim 4, wherein when the value of the UE-specific parameter is 0, the periodic and aperiodic SRS power offset parameters is determined in units of 1.5 dB within the range of [−10.5, 12] dB.

7. The method of claim 1, wherein the transmission of the aperiodic SRS is triggered by a triggering message transmitted from the BS.

8. A user equipment (UE) in a wireless communication system, the UE comprising:
a radio frequency (RF) unit; and
a processor, coupled to the RF unit, and configured to:
receive separate periodic and aperiodic sounding reference signal (SRS) power offset parameters for a periodic SRS and an aperiodic SRS, respectively, from a base station (BS) through a radio resource control (RRC) signaling;
receive common parameters for both the periodic SRS and the aperiodic SRS from the BS through the RRC signaling;
set transmission powers of the periodic SRS and the aperiodic SRS based on the periodic and aperiodic SRS power offset parameters, respectively, and the common parameters; and
transmit the periodic SRS and the aperiodic SRS to the BS based on the transmission powers of the periodic SRS and the aperiodic SRS, respectively,
wherein the periodic SRS power offset parameters are non-common parameters used for transmitting the periodic SRS but not the aperiodic SRS, and the aperiodic SRS power offset parameters are non-common parameters used for transmitting the aperiodic SRS but not the periodic SRS.

9. The UE of claim 8, wherein at least one of the periodic SRS power offset parameters and at least one of the aperiodic SRS power offset parameters have a length of 4 bits, respectively.

10. The UE of claim 8, wherein the transmission power of the periodic SRS and the transmission power of the aperiodic SRS are determined by Equation below:

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\},$$

wherein i is a subframe index, c is a serving cell, $P_{CMAX,c}(i)$ is pre-set transmission power of the UE, $P_{SRS\_OFFSET,c}(m)$ denotes one of the periodic SRS power offset parameters when m=0 and $P_{SRS\_OFFSET,c}(m)$ denotes one of the aperiodic SRS power offset parameters when m=1, $M_{SRS,c}$ is a bandwidth of the SRS transmission indicated by the number of resource blocks, $P_{O\_PUSCH,c}(j)$ is a parameter configured by the sum of $P_{O\_NOMINAL\_PUSCH}(j)$, a cell-specific component given by an higher layer, and $P_{O\_UE\_PUSCH}(j)$, a UE-specific component also given by the higher layer, $\alpha_c(j)$ is a cell-specific parameter given by the upper layer, $PL_c$ is an estimated value of pathloss calculated by the UE, and f(i) indicates a current power control adjustment state with respect to a physical uplink shared channel (PUSCH).

11. The UE of claim 8, wherein at least one of the periodic SRS power offset parameters and at least one of the aperiodic SRS power offset parameters are determined by a UE-specified parameter indicating a compensation value having a size of a transport block in power controlling.

12. The UE of claim 11, wherein when the value of the UE-specific parameter is 1.25, the at least one of the periodic and aperiodic SRS power offset parameters is determined in units of 1 dB within the range of [−3, 12] dB.

13. The UE of claim 11, wherein when the value of the UE-specific parameter is 0, the at least one of the periodic and aperiodic SRS power offset parameters is determined in units of 1.5 dB within the range of [−10.5, 12] dB.

* * * * *